US012470835B2

(12) United States Patent
Furman et al.

(10) Patent No.: US 12,470,835 B2
(45) Date of Patent: Nov. 11, 2025

(54) METHOD AND APPARATUS FOR ANALYZING A DIRTY CAMERA LENS TO DETERMINE IF THE DIRTY CAMERA LENS CAUSES A FAILURE TO DETECT VARIOUS EVENTS

(71) Applicant: MOTOROLA SOLUTIONS, INC., Chicago, IL (US)

(72) Inventors: Piotr Furman, Grojec (PL); Lukasz Osuch, Pszczyna (PL); Wojciech Wojcik, Cracow (PL); Francesco Costanzo, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 362 days.

(21) Appl. No.: 18/164,653

(22) Filed: Feb. 6, 2023

(65) Prior Publication Data
US 2024/0267636 A1    Aug. 8, 2024

(51) Int. Cl.
*H04N 23/81*    (2023.01)
*H04N 23/63*    (2023.01)

(52) U.S. Cl.
CPC ......... *H04N 23/811* (2023.01); *H04N 23/635* (2023.01)

(58) Field of Classification Search
CPC .................. H04N 23/811; H04N 23/635
USPC ........................................................ 348/241
See application file for complete search history.

(56) References Cited

U.S. PATENT DOCUMENTS

| 6,940,554 B2* | 9/2005 | Robins | H04N 23/81 348/335 |
| 8,208,043 B2* | 6/2012 | Deng | G06T 7/13 348/241 |
| 10,089,540 B2 | 10/2018 | May et al. | |
| 10,521,890 B2* | 12/2019 | Guerreiro | G06T 7/0002 |
| 11,210,777 B2 | 12/2021 | Fitzgerald et al. | |
| 12,047,682 B1* | 7/2024 | Furman | H04N 23/69 |

(Continued)

FOREIGN PATENT DOCUMENTS

WO    2015011998 A1    1/2015

OTHER PUBLICATIONS

Nelson, Joseph: "The Importance of Blur as an Image Augmentation Technique", Image Augmentation Image Preprocessing, Mar. 13, 2020, https://blog.roboflow.com/using-blur-in-computer-vision-preprocessing/, all pages.

(Continued)

*Primary Examiner* — Usman A Khan

(57) ABSTRACT

A method and apparatus for analyzing a dirty camera lens to determine if the dirty camera lens causes a failure to detect various events is provided herein. During operation, a filter is created that, when applied to previously-recorded video, mimics a dirty camera lens currently existing on a camera. The filter can then be applied to video taken previously with the camera as a result of an event being detected. The video analytics to detect the event are run again on the filtered video to see if the event is again detected. If the event was detected in both the filtered and unfiltered video, it is assumed that the particular event can still be detected even with the dirty lens. If the results differ, an alert can be sent to an operator indicating that the camera may no longer be capable of detecting the particular event.

14 Claims, 6 Drawing Sheets

(56) References Cited

U.S. PATENT DOCUMENTS

| | | | | |
|---|---|---|---|---|
| 12,073,536 | B2* | 8/2024 | Katz | G06T 7/0002 |
| 2006/0017820 | A1* | 1/2006 | Kim | H04N 5/772 |
| | | | | 386/E5.072 |
| 2010/0208093 | A1* | 8/2010 | Lee | H04N 23/611 |
| | | | | 348/222.1 |
| 2010/0302398 | A1* | 12/2010 | An | H04N 23/811 |
| | | | | 348/222.1 |
| 2010/0303380 | A1* | 12/2010 | Demandolx | H04N 25/68 |
| | | | | 382/275 |
| 2011/0081088 | A1* | 4/2011 | Xiao | G06V 20/10 |
| | | | | 382/218 |
| 2011/0261236 | A1* | 10/2011 | Tamura | H04N 25/611 |
| | | | | 348/E9.037 |
| 2013/0208164 | A1* | 8/2013 | Cazier | H04N 25/61 |
| | | | | 348/333.04 |
| 2014/0232869 | A1* | 8/2014 | May | H04N 23/811 |
| | | | | 348/148 |
| 2014/0293079 | A1* | 10/2014 | Milanfar | H04N 23/811 |
| | | | | 348/222.1 |
| 2016/0004144 | A1* | 1/2016 | Laroia | G03B 17/02 |
| | | | | 348/222.1 |
| 2016/0180504 | A1* | 6/2016 | Kounavis | G06T 5/40 |
| | | | | 348/241 |
| 2017/0109590 | A1* | 4/2017 | Gehrke | G06T 7/0002 |
| 2017/0180615 | A1* | 6/2017 | Lautenbach | H04N 23/64 |
| 2018/0096474 | A1* | 4/2018 | Guerreiro | G06T 7/0002 |
| 2019/0084526 | A1* | 3/2019 | Seubert | G06T 5/90 |
| 2019/0164271 | A1* | 5/2019 | Herchenbach | G06T 7/0002 |
| 2020/0084389 | A1* | 3/2020 | Candelore | H04N 23/811 |
| 2020/0267287 | A1* | 8/2020 | Solomon | H04N 23/67 |
| 2022/0383467 | A1* | 12/2022 | Katz | H04N 13/257 |

OTHER PUBLICATIONS

Videotec, Video Security Products, https://www.videotec.com/cat/en/products/washing-systems/was-washing-systems/was-waspt/, downloaded from internet: Feb. 2, 2023, all pages.

Brownlee, Jason: "How to Configure Image Data Augmentation in Keras", in Deep Learning for Computer Vision, Apr. 12, 2019, last updated Jul. 5, 2019, https://machinelearningmastery.com/how-to-configure-image-data-augmentation-when-training-deep-learning-neural-networks/, all pages.

Furman, Piotr, et al.: "Method and Apparatus for Adjusting a Field of View of a Camera Based on a Detection of a Blemish on a Camera Lens", U.S. Appl. No. 18/155,085, filed Jan. 17, 2023, all pages.

Brownlee, Jason: "How to Use Test-Time Augmentation to Make Better Predictions", in Deep Learning for Computer Vision, Apr. 15, 2019, last updated on Apr. 3, 2020, all pages.

* cited by examiner

METHOD AND APPARATUS FOR ANALYZING A DIRTY CAMERA LENS TO DETERMINE IF THE DIRTY CAMERA LENS CAUSES A FAILURE TO DETECT VARIOUS EVENTS

BACKGROUND OF THE INVENTION

It is known to automatically detect a dirty camera lens and perform mitigation techniques (i.e., automatic cleaning, cleaning by hand, rotating a shield, . . . , etc.). For example, U.S. Pat. No. 10,089,540, entitled VEHICLE VISION SYSTEM WITH DIRT DETECTION, and incorporated by reference herein, provides a vision system that is operable to detect light and dark blemishes in captured image data and to determine when such blemishes are indicative of dirt or water droplets or the like at the lens of the camera. After detection of dirt, various mitigation techniques are usually employed to remove the detected dirt.

While systems for automatically detecting blemishes and cleaning a camera lens will improve the resolution and detection capabilities of cameras, oftentimes camera lenses are unnecessarily cleaned when the dirty lens does not affect detection capabilities of the camera. This leads to unnecessary work for users tasked with cleaning the cameras, especially if the cameras are in hard-to-reach areas. Therefore a need exists for a method and apparatus for analyzing a dirty camera lens to determine if the dirty camera lens causes a failure to detect various events. Mitigation can be performed when the dirty camera lens negatively affects the camera's ability to detect at least some of the various events.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
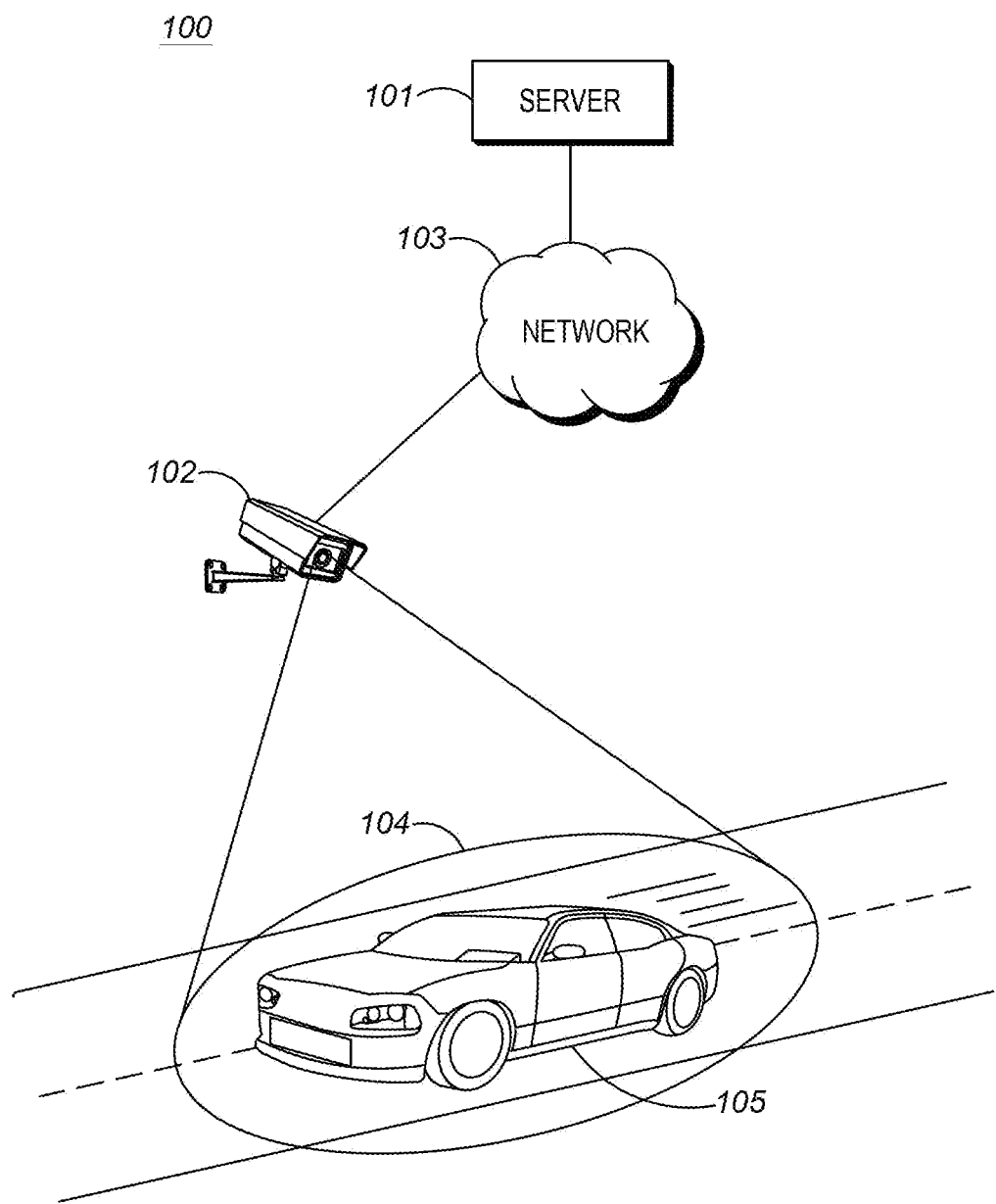
FIG. 1 illustrates a general operating environment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for analyzing a dirty camera lens to determine if the dirty camera lens causes a failure to detect various events is provided herein. During operation, a filter is created that, when applied to previously-recorded video, mimics a dirty camera lens currently existing on a camera. The filter can then be applied to video taken previously with the camera as a result of an event being detected. The video analytics to detect the event are run again on the filtered video to see if the event is again detected. If the event was detected in both the filtered and unfiltered video, it is assumed that the particular event can still be detected even with the dirty lens. Cleaning the lens can be delayed. If the results differ, an alert (alarms) can be sent to an operator indicating that the camera may no longer be capable of detecting the particular event.

It should be noted that in many security systems, when an event is detected by video analytics, video is recorded and stored as a result of the detected event, and a notification is sent to at least one user. Some of the most common events that trigger recordings are motion detection, object detection (e.g., automobile, person, face, . . . , etc), license-plate detection, crowd detection, anomaly detection, and facial recognition (recognizing a particular person). Other events may be detected as well.

It should also be noted that in one embodiment of the present invention the above-described analysis on the camera lens may be performed periodically, for example, once an hour. However, in alternate embodiments of the present invention, the above-described analysis may be performed only after a blemish is detected on the camera lens (for example, as described in '540 patent). Thus, the detection of a blemish on a camera lens will cause the above analysis to take place.

In one embodiment of the present invention, multiple videos may be analyzed as described above in order to determine a camera's ability to detect multiple events. For example, a video created because of motion being detected may be analyzed as described above to determine if motion can still be detected with the filter applied to the video. Also, a second video created because of a particular object was detected may be analyzed as described above to determine if the particular object can still be detected with the filter applied to the second video. This process can continue until videos created because of the detection of all potential events are analyzed as described above.

For example, assume that a video surveillance system is designed to detect three particular events, specifically, any motion, any automobile, and, a person named Fred Smith. Once the system is triggered by the detection of an event such as motion, a person, or Fred Smith being detected, a video is recorded and stored. A notification may be sent to users indicating the particular detection. Assume that videos exist that comprise the detection of motion, automobiles, and Fred Smith. Each one of these videos may be filtered as described above, and the same video analysis may be performed to determine if similar detections exist in the filtered and unfiltered videos.

It should be noted that some events may still be able to be detected with the filtered video, while some may not. For example, motion may still be detected on the filtered video, however, the particular detection of Fred Smith may fail. This information may be provided to users in order for them to determine if the camera lens may need cleaning.

In various embodiments of the present invention, a score may be determined based on how well the various events are detected on the filtered video. For example, in the above scenario with three events being detected, if all events are capable of being detected on the filtered video, then a score of "3" may be generated for the camera lens. However, if only two of the three events are able to be detected on the filtered video, a score of "2" may be applied. This scoring may continue until a score of "0" is given if no events are able to be detected on the filtered video.

In a similar manner, a percentage may be given as a score, where the percentage indicates the percentage of videos that fail to detect events. For example, if 100 filtered videos are analyzed for various events, and 40 filtered videos fail to have events detected, then a score of "40" may be generated for the camera lens.

With the above in mind, FIG. 1 illustrates a general operating environment 100 for the present invention. As shown, environment 100 is equipped with at least one camera 102 positioned to capture images/video of objects as they roam through the camera's FOV 104. Server 101 is configured to store any video or images obtained from camera 102, determine that a camera lens is dirty (i.e., a blemish exists on the camera lens), create a filter that represents the dirty camera lens, apply the filter to stored video, and provide information to a user regarding the camera's capabilities to detect various events.

Server 101 may be configured to use various video analysis engines to identify an object, track the object, determine objects entering or exiting FOV 104, predict where an object is moving, determine identifying characteristics of the objects, perform facial recognition, read license plates, . . . , etc. In order to accomplish this, camera 102 is attached (i.e., connected) to server 101 through network 103 via a network interface. Example networks include any combination of wired and wireless networks, such as Ethernet, T1, Fiber, USB, IEEE 802.11, 3GPP LTE, and the like. During operation, server 101 receives video feeds from camera 102, performs video analysis on the video, detects events, and stores video of the detected events along with information on why the video was created (e.g., motion detected).

Figure 2:
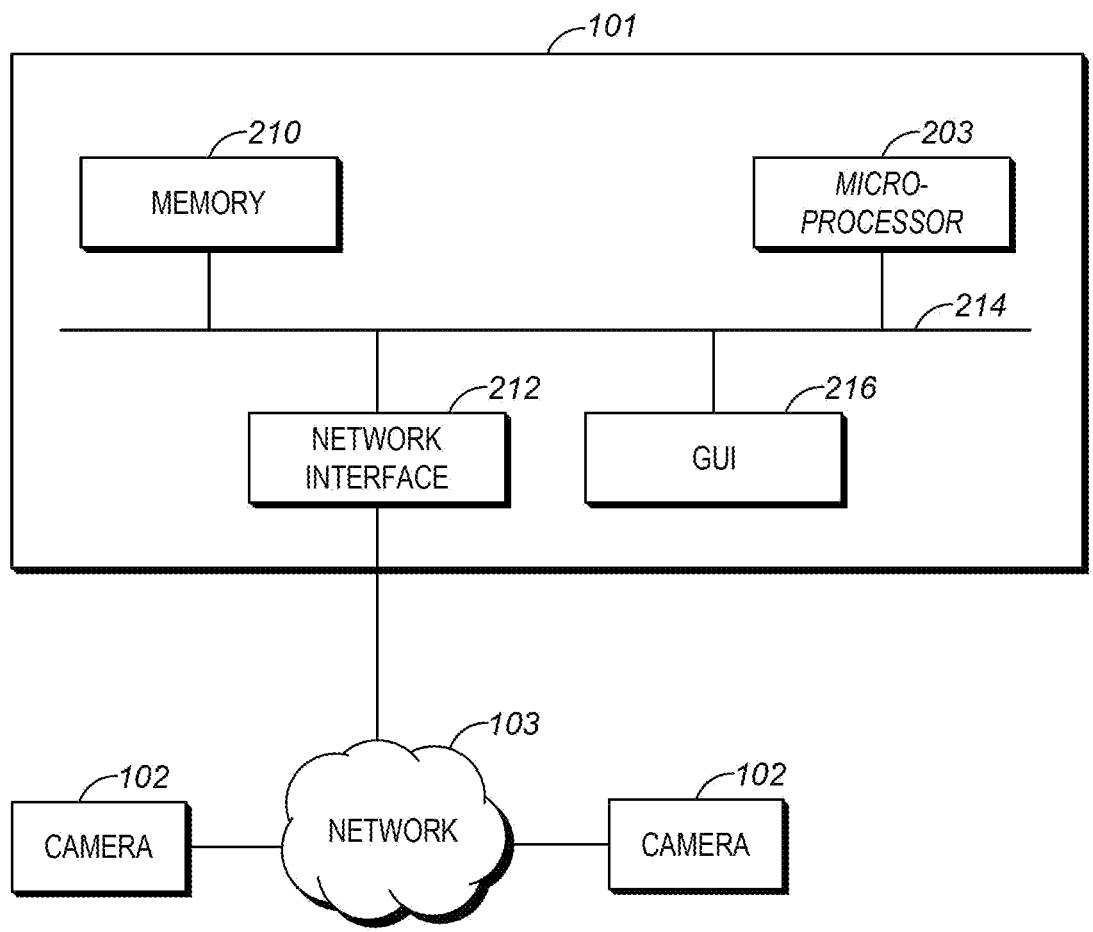
FIG. 2 is a block diagram of the server of FIG. 1.

FIG. 2 illustrates a block diagram of server 101 in accordance with some embodiments. Server 101 may include various components connected by a bus 214. Server 101 may include a hardware processor (logic circuitry) 203 such as one or more central processing units (CPUs) or other processing circuitry able to provide any of the functionality described herein when running instructions. Logic circuitry 203 may be connected to memory 210 that may include a non-transitory machine-readable medium on which is stored one or more sets of instructions. Memory 210 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory.

The instructions stored in memory 210 enable server 101 and camera 102 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network via a network interface 212 utilizing any one of a number of transfer protocols (e.g., frame relay, internet protocol (IP), transmission control protocol (TCP), user datagram protocol (UDP), hypertext transfer protocol (HTTP), etc.).

Network interface 212 may thus enable server 101 to receive video from cameras 102 through network 103 via wired or wireless communication. Network interface 212 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4 G, 5 G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which server 101 may be connected via network interface 212 may include a local area network (LAN), a wide area network (WAN), a packet data network (e.g., the Internet), mobile telephone networks (e.g., cellular networks), and wireless data networks.

Cameras 102 includes circuitry to image its geographic surroundings. Camera 102 electronically captures a sequence of video frames (i.e., a sequence of one or more still images), with optional accompanying audio, in a digital format at a particular frame rate. The images or video captured by the image/video camera 102 may be stored in the storage component 210, or within internal memory (not shown).

Memory 210 is configured with at least one recognition engine/video analysis engine (VAE) that comprises a software engine that when utilized by logic circuitry 203, causes logic circuitry 203 to analyze any video captured by the cameras for a particular event. Using the VAE, logic circuitry 203 is capable of "watching" video to detect events, store video of the events, and report the detected events to users.

Alternatively, cameras 102 may be equipped with memory and logic circuitry to perform event detection. Regardless if event detection takes place within server 101, or camera 102, video is recorded for a predetermined amount of time (e.g., 20 seconds) capturing the event. It should be noted that among the various VAEs possible of being utilized by logic circuitry 203, at least a VAE that detects motion, a VAE that detects a particular person's face, and a VAE that detects a particular object are included within memory 210.

Graphical-User Interface (GUI) 214 provides a man/machine interface for receiving an input from a user and displaying information. For example, GUI 506 may provide a way of conveying (e.g., displaying) information received from processor 203. Part of this information may comprise information about a camera's ability to detect events (e.g., a score, as described above). In order to provide the above features (and additional features), GUI 216 may comprise any combination of a touch screen, a computer screen, a keyboard, or any other interface needed to receive a user input and provide information to the user.

During operation, logic circuitry 203 will create a filter that models any blemishes on a camera's lens. This filter will then be applied to any videos captured by that camera based on events happening. So, for example, if a particular video within memory 210 was captured by a particular camera 102 because of motion being detected, then logic circuitry 201 will apply the filter to that video and use the motion detection VAE in memory 210 to see if motion is still detected from the particular video. This process may repeat for multiple videos stored in memory 210 taken by the particular camera 102. This information may be provided to a user by sending the information via network interface 212 to the user, or displaying it on a graphical-user 216.

With the above in mind, FIG. 2 comprises an apparatus comprising memory configured to store a video that was created at a prior time as a result of an event being detected with a camera. Logic circuitry is provided and configured to create a filter representing a dirty camera lens that currently exists on the camera, apply the filter to the video to create a filtered video, determine if the event is still detected on the filtered video, and send a notification to a user indicating that the event is no longer able to be detected by the camera.

As discussed above, the event comprises the detection of a particular object, the detection of motion, the detection of a particular person, or the detection of a license plate.

Additionally, a graphical-user interface may be provided for displaying the notification.

The logic circuitry may additionally configured to apply the filter to multiple videos stored in the memory and created because the event was detected in order to create multiple filtered videos. The logic circuitry can then determine if the event is still detected on the multiple filtered videos, create a score for the camera based on how many events can still be detected on the multiple filtered videos, and send the score to the user as part of the notification. The score can be based on a percentage of the filtered videos where the event cannot be detected.

The apparatus of FIG. 2 can be used to notify users that multiple different events are no longer capable of being detected. With this in mind the memory is configured to store a plurality of videos that were created at a prior time as a result of various different events being detected with a camera. Logic circuitry is then configured to create a filter representing a dirty camera lens that currently exists on the camera, apply the filter to the plurality of videos to create a plurality of filtered videos, determine if the events that triggered the creation of the videos are still detected on the filtered videos, and send a notification to a user indicating that various events are no longer able to be detected by the camera.

Creating a filter consists of 4 phases: detecting dirt on lenses, mapping it to the camera's field of view, storing the mapping, and transforming the mapping to an output format. Detecting the dirt may be realized in any known method such as the one described in '540 patent, moving a camera's pan, tilt, or zoom and observing which pixels in output frames have always the same value, comparing frames from a static camera and detecting which pixels do not change in time, checking edge strength of objects within a single frame to detect transparent dirt, calculating difference in local gradient to detect solid dirt, . . . , etc.

Once dirt is detected, the detected dirt is mapped on regions in the camera's field of view by calculating which pixels in the output frames are affected by the dirt. It may be done in the form of Cartesian coordinates within the output frame with origin point (0,0) in the middle of the frame. The filter comprises pixel coordinates of the dirt, and a color or opacity for each of the pixel coordinates (e.g., brown).

Storing the filter comprises storing the calculated coordinates of dirty pixels value which represents features of dirt on these pixels. One of such features is opacity. The dirt may be solid, semi-transparent and transparent. Another feature may be color. The last phase is transforming the stored filter to the expected color model e.g RGB or HSV.

Figure 3:
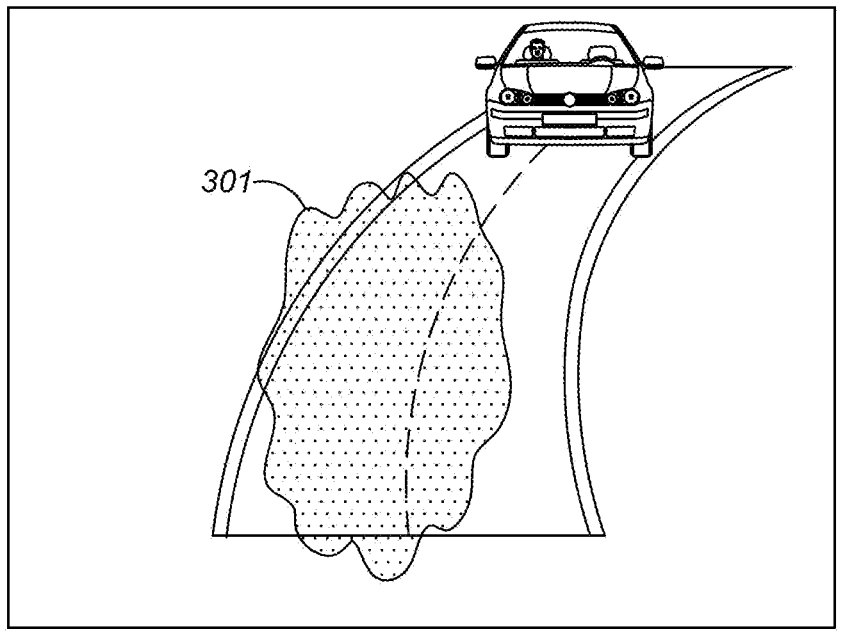
FIG. 3 illustrates a blemish on a camera lens.

FIG. 3 illustrates a video recorded through a camera having a blemish 301 on a camera lens. As is evident, blemish 301 has the potential of interfering with the quality of any video captured by the camera. For example, as car passes through blemish 301, certain VAEs may not be capable of detecting various events. With this in mind, an image filter is created representing the blemish 301. This is illustrated in FIG. 4 with a modeled blemish 401 applied to a white background.

Figure 5:
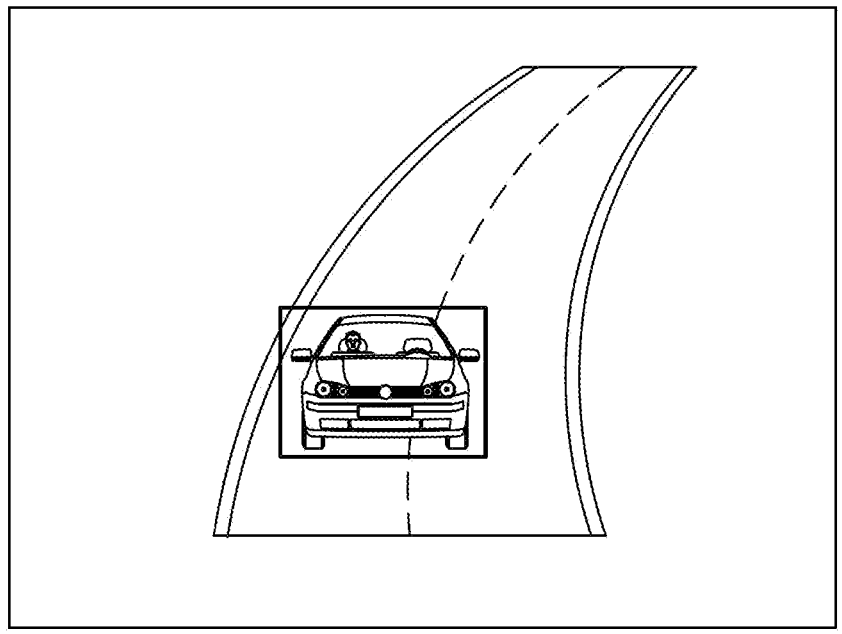
FIG. 5 illustrates stored video captured because an object was detected.

FIG. 5 illustrates stored video 500 captured in the past because an event was detected. In this case, the video was captured because of motion being detected. This video is stored in memory 210.

Figure 4:
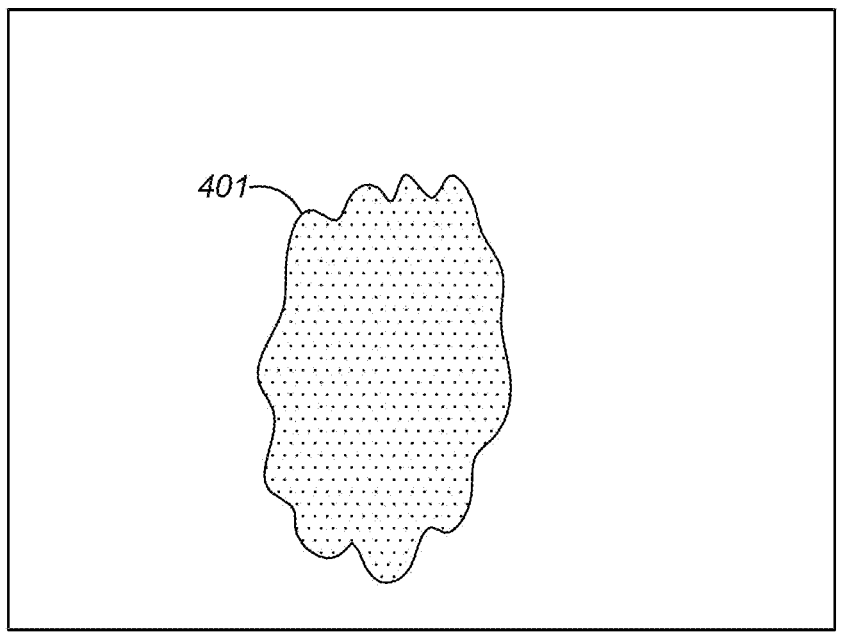
FIG. 4 illustrates a model of the blemish of FIG. 3 that can be used as a filter that is applied to stored video.
Figure 6:
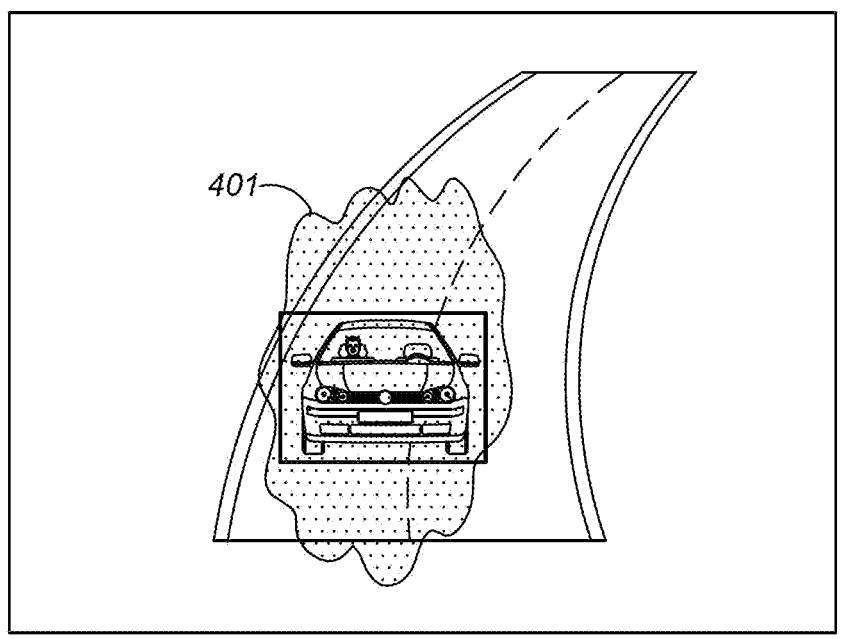
FIG. 6 illustrates the modeled blemish of FIG. 4 applied as a filter to the stored video of FIG. 5.

FIG. 6 illustrates modeled blemish 401 of FIG. 4 applied as a filter to the stored video of FIG. 5. As is evident, the resulting video 600 has at least part of the vehicle obscured by the blemish. The VAE that detects motion may be run on video 600 to determine if motion is again detected.

Figure 7:
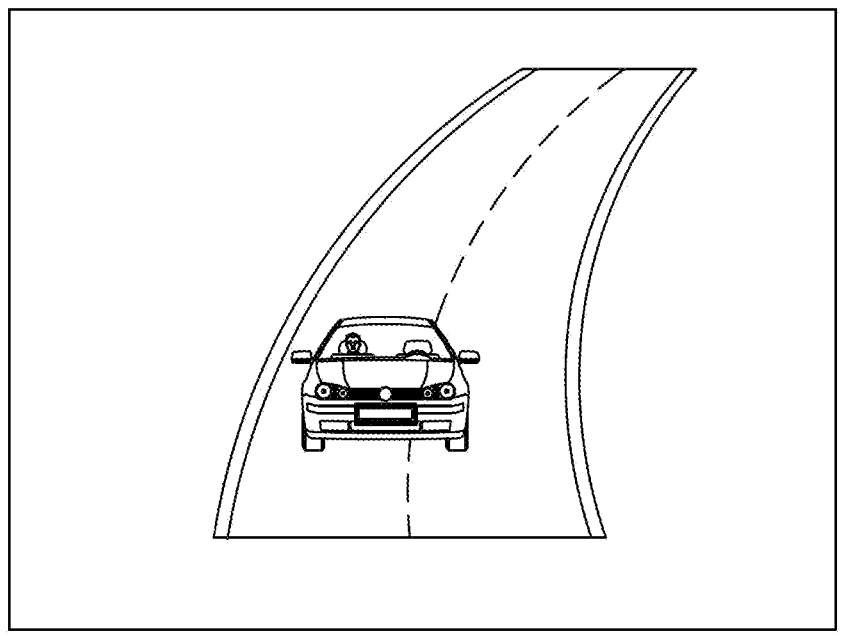
FIG. 7 illustrates stored video captured because motion was detected.

FIG. 7 illustrates stored video 700 captured in the past because an event was detected. In this case, the video was captured because of a license plate being detected and read with an automatic-license-plate reader (ALPR). This video is stored in memory 210.

Figure 8:
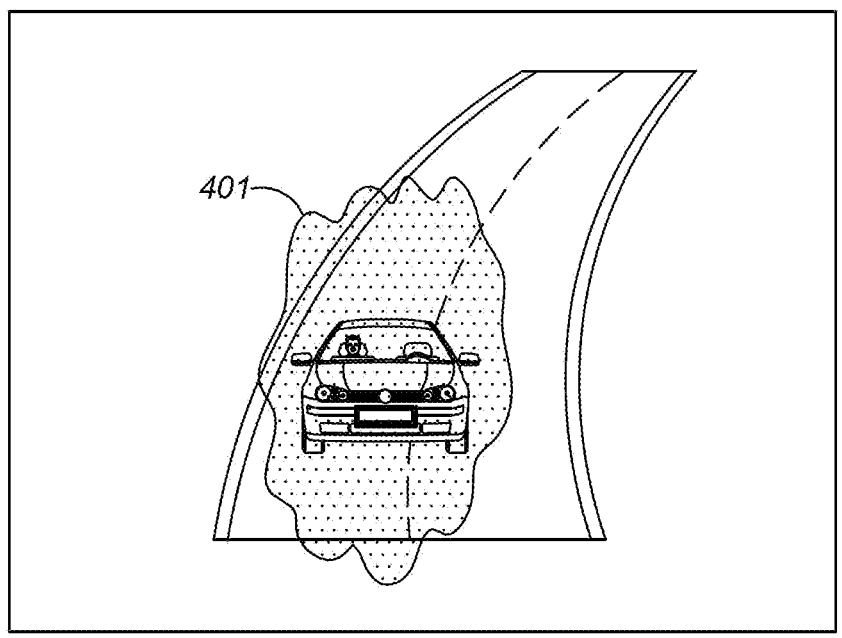
FIG. 8 illustrates the modeled blemish of FIG. 4 applied as a filter to the stored video of FIG. 7.

FIG. 8 illustrates modeled blemish 401 of FIG. 4 applied as a filter to the stored video of FIG. 7. As is evident, the resulting video 800 has at least part of the license plate obscured by the blemish. The VAE that detects and reads the license plate may be run on video 700 to determine if the license plate can again detected be detected and read.

Figure 9:
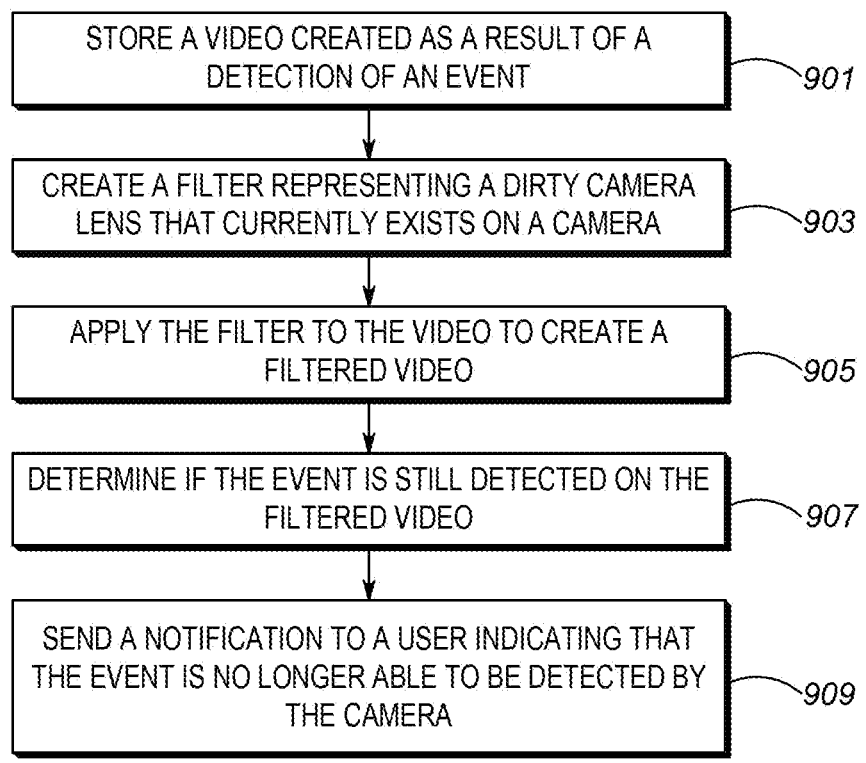
FIG. 9 is a flow chart showing operation of the server of FIG. 2.

FIG. 9 is a flow chart showing operation of the server of FIG. 2. The logic flow begins at step 901 apparatus 101 stores a video created as a result of a detection of an event. At step 903, logic circuitry 203 creates a filter representing a dirty camera lens that currently exists on a camera. The logic flow then continues to step 905 where logic circuitry 203 applies the filter to the video to create a filtered video, and determines if the event is still detected on the filtered video (step 907). Finally, at step 909 logic circuitry 203 sends a notification to a user indicating that the event is no longer able to be detected by the camera.

In the foregoing specification, specific embodiments have been described. However, one of ordinary skill in the art appreciates that various modifications and changes can be made without departing from the scope of the invention as set forth in the claims below. For example, the description above provided for a server determining a blemish exists on a camera lens, creating a filter from the blemish, and applying the filter to stored videos to determine if a camera lens needs cleaning. However, one of ordinary skill in the art will recognize that this functionality may be placed directly within camera 102 such that camera 102 is equipped with logic circuitry 203 and other necessary components to perform the functions described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   memory configured to store a video that was created at a prior time as a result of an event being detected with a camera;
   logic circuitry configured to:
      create a filter representing a dirty camera lens condition that currently exists on the camera;
      apply the filter to the video to create a filtered video that simulates how the video would appear if captured with the dirty camera lens condition;
      determine if the event is still detected on the filtered video using a same video analysis engine that was used to originally detect the event; and
      send a notification to a user indicating that the event is no longer able to be detected by the camera with the dirty camera lens condition.

2. The apparatus of claim 1 wherein the event comprises the detection of a particular object, the detection of motion, the detection of a particular person, or the detection of a license plate.

3. The apparatus of claim 2 further comprising:
   a graphical-user interface displaying the notification.

4. The apparatus of claim 1 wherein the logic circuitry is additionally configured to:
   apply the filter to multiple videos stored in the memory and created because the event was detected in order to create multiple filtered videos;
   determine if the event is still detected on the multiple filtered videos;
   create a score for the camera based on how many events can still be detected on the multiple filtered videos; and
   send the score to the user as part of the notification.

5. The apparatus of claim 4 wherein the score is based on a percentage of the filtered videos where the event cannot be detected.

6. An apparatus comprising:
   memory configured to store a plurality of videos that were created at a prior time as a result of various events being detected with a camera;
   logic circuitry configured to:
      create a filter representing a dirty camera lens condition that currently exists on the camera;
      apply the filter to the plurality of videos to create a plurality of filtered videos that simulates how each video of the plurality of videos would appear if captured with the dirty camera lens condition;
      determine if the events that triggered the creation of the videos are still detected on the filtered videos using a same video analysis engine that was used to originally detect the event; and
      send a notification to a user indicating that various events are no longer able to be detected by the camera with the dirty camera lens condition.

7. The apparatus of claim 6 wherein the various events comprise the detection of a particular object, the detection of motion, the detection of a particular person, or the detection of a license plate.

8. The apparatus of claim 6 further comprising:
   a graphical-user interface displaying the notification.

9. The apparatus of claim 6 wherein the notification comprises a score that is based on a percentage of the filtered videos where the event cannot be detected.

10. A method comprising the steps of:
    storing a video created as a result of a detection of an event;
    creating a filter representing a dirty camera lens condition that currently exists on a camera;
    applying the filter to the video to create a filtered video that simulates how the video would appear if captured with the dirty camera lens condition;
    determining if the event is still detected on the filtered video using a same video analysis engine that was used to originally detect the event; and
    sending a notification to a user indicating that the event is no longer able to be detected by the camera with the dirty camera lens condition.

11. The method of claim 10 wherein the event comprises the detection of a particular object, the detection of motion, the detection of a particular person, or the detection of a license plate.

12. The method of claim 11 further comprising the step of:
    displaying the notification on a graphical-user interface.

13. The method of claim 10 further comprising the steps of:
    applying the filter to multiple videos created because the event was detected in order to create multiple filtered videos;
    determining if the event is still detected on the multiple filtered videos;
    creating a score for the camera based on how many events can still be detected on the multiple filtered videos; and
    sending the score to the user as part of the notification.

14. The method of claim 13 wherein the score is based on a percentage of the filtered videos where the event cannot be detected.

* * * * *